US009588251B2

(12) United States Patent
Cooper

(10) Patent No.: US 9,588,251 B2
(45) Date of Patent: Mar. 7, 2017

(54) STABILIZING A SPECTRUM USING TWO POINTS

(71) Applicant: Halliburton Energy Services, Houston, TX (US)

(72) Inventor: Paul Andrew Cooper, Houston, TX (US)

(73) Assignee: HALLIBURTON ENERGY SERVICES, Houston, TX (US)

(*) Notice: Subject to any disclaimer, the term of this patent is extended or adjusted under 35 U.S.C. 154(b) by 77 days.

(21) Appl. No.: 14/434,010

(22) PCT Filed: Oct. 24, 2012

(86) PCT No.: PCT/US2012/061524
§ 371 (c)(1),
(2) Date: Apr. 7, 2015

(87) PCT Pub. No.: WO2014/065789
PCT Pub. Date: May 1, 2014

(65) Prior Publication Data
US 2015/0253455 A1    Sep. 10, 2015

(51) Int. Cl.
*G01V 5/12* (2006.01)
*G06K 9/46* (2006.01)
(Continued)

(52) U.S. Cl.
CPC .......... *G01V 5/12* (2013.01); *G01T 1/2018* (2013.01); *G01T 1/40* (2013.01); *G06K 9/4642* (2013.01); *G06K 9/52* (2013.01)

(58) Field of Classification Search
None
See application file for complete search history.

(56) References Cited

U.S. PATENT DOCUMENTS 3,258,593 A    6/1966 Reed
3,849,646 A    11/1974 Mckinlay et al.
(Continued)

FOREIGN PATENT DOCUMENTS

| EP | 0640848 A1 | 3/1995 |
|---|---|---|
| GB | 2172103 A | 9/1986 |
| RU | 2225017 C2 | 2/2004 |

OTHER PUBLICATIONS

Parker, J. L.—"General Topics in Passive Gamma-Ray Assay"—Passive Nondestructive Assay of Nuclear Materials, NUREG/CR-5550 (1991), pp. 95-158.*
(Continued)

*Primary Examiner* — Bernard Krasnic
(74) *Attorney, Agent, or Firm* — Howard L. Speight, PLLC

(57) ABSTRACT

A histogram includes a plurality of channels Ch1, Ch2, ... ChN, which have respective channel numbers C1, C2, ... CN. ChA with channel number CA, 1<A<N, representing a first peak, is associated with a known first-peak energy (EA). ChB with channel number CB, 1<B<N, A≠B, representing a second peak, is associated with a known second-peak energy (EB). A system of equations, including a first equation that is a function of EA and CA and a second equation that is a function of EB and CB, is solved for an energy scale, κ, and a zero offset, E0. A function of EM, CM, κ, and E0 is used to identify features in the histogram, wherein EM is an energy associated with the Mth channel in the histogram, and CM is the channel number of the Mth channel (ChM) in the histogram.

15 Claims, 8 Drawing Sheets

(51) Int. Cl.
*G01T 1/20* (2006.01)
*G06K 9/52* (2006.01)
*G01T 1/40* (2006.01)

(56) References Cited

U.S. PATENT DOCUMENTS

| | | | |
|---|---|---|---|
| 4,016,418 A | | 4/1977 | Horrocks et al. |
| 4,300,043 A | | 11/1981 | Robbins |
| 4,326,129 A | | 4/1982 | Neufeld |
| 4,450,354 A | | 5/1984 | Smith et al. |
| 4,524,273 A | | 6/1985 | Hubner |
| 4,529,877 A | | 7/1985 | Arnold |
| 4,558,220 A | | 12/1985 | Evans |
| 4,730,263 A | | 3/1988 | Mathis |
| 4,879,463 A | | 11/1989 | Wraight et al. |
| 5,360,975 A | | 11/1994 | Stoller |
| 5,459,314 A | | 10/1995 | Plasek |
| 5,532,122 A | | 7/1996 | Drukier |
| 6,006,162 A | * | 12/1999 | Haywood ............... G01J 3/42 250/339.07 |
| 7,081,616 B2 | | 7/2006 | Grau et al. |
| 2003/0007600 A1 | | 1/2003 | Bateman et al. |
| 2008/0265151 A1 | * | 10/2008 | Gadot .................... G01V 5/04 250/261 |
| 2010/0116978 A1 | | 5/2010 | Stoller et al. |
| 2010/0198542 A1 | | 8/2010 | Troxler |
| 2010/0236776 A1 | | 9/2010 | Spross et al. |

OTHER PUBLICATIONS

Canadian Intellectual Property Office, Examiner's Requisition, Application No. 2,882,742, which is a CA counterpart to the instant application, Mar. 9, 2016.
Australia Government IP Australia, Patent Examination Report No. 1, Patent Application No. 2012392994, which is an AU counterpart to the instant application, Feb. 3, 2016.
Australian Government IP Australia, Patent Examination Report No. 2, Patent Application No. 2012392994, which is an AU counterpart to the instant application, Mar. 11, 2016.
English translation of Federal Service on Intellectual Property (FIIP), Notification of the Results of the Patentability Analysis, Application No. 2015113010/28(020350), which is an RU counterpart of the instant application, Jan. 28, 2016.
European Patent Office, Supplementary European Search Report, Application No./Patent No. 12886959.1-1559 / 2872924 PCT/US2012061524, which is an EP counterpart to the instant application, Feb. 10, 2016.
Federal Government Institute, Federal Institute of Industrial Property of the Federal Service on Industrial Property, Patent and Trademarks (FGI FIIP), Search Report, Application Identification: 2015113010/28(020350), which is an RU counterpart of the instant application, Jan. 22, 2016.
Federal Service on Intellectual Property (FIIP), Notification of the Results of the Patentability Analysis, Application No. 2015113010/28(020350), which is an RU counterpart of the instant application, Jan. 28, 2016.
International Searching Authority, The International Search Report and Written Opinion, International Application No. PCT/US1261524, which is the PCT parent of the instant application, Jan. 22, 2013.
Saint-Gobain, Optimizing Pulse Height Resolution Measurements, accessed on Apr. 7, 2015 from http://www.crystals.saint-gobain.com/uploadedFiles/SG-Crystals/Documents/Operation_Handling/Optimizing%20PHR%20Measurements.pdf, copyright dates 2007-2014.
University of Florida—Department of Physics PHY 4803L—Advanced Physics Laboratory, Gamma Ray Spectroscopy Experiment GRS, Oct. 31, 2011.
Australian Government IP Australia, Notice of Acceptance, Application No. 2012392994, which is an AU counterpart to the instant application, Jul. 11, 2016.
The State Intellectual Property Office of the People's Republic of China, The First Office Action, Application No. 2012800759482, which is CN counterpart to the instant application, Jul. 5, 2016, translation filed herewith.
Translation of the State Intellectual Property Office of the People's Republic of China, The First Office Action, Application No. 2012800759482, which is CN counterpart to the instant application, Jul. 5, 2016.
Australian Government IP Australia, Certificate of Grant Standard Patent, Application No. 2012392994, entire document, which is an AU counterpart to the instant application, Nov. 3, 2016.

* cited by examiner

STABILIZING A SPECTRUM USING TWO POINTS

CROSS REFERENCE TO RELATED APPLICATIONS

This application is the United States National Stage of International Application No. PCT/US2012/61524, filed Oct. 24, 2012.

BACKGROUND

In density logging, scintillation detectors measure radiation from a formation to estimate the electron density and photoelectric factor of the formation. The energy of detected radiation is measured and quantized into "counts." The counts are binned into "channels" depending on their energy. The energy associated with each channel can change as the function of temperature and detector age. Stabilizing the spectrum, so that each channel corresponds to a known energy, is a challenge.

DETAILED DESCRIPTION

Figure 1:
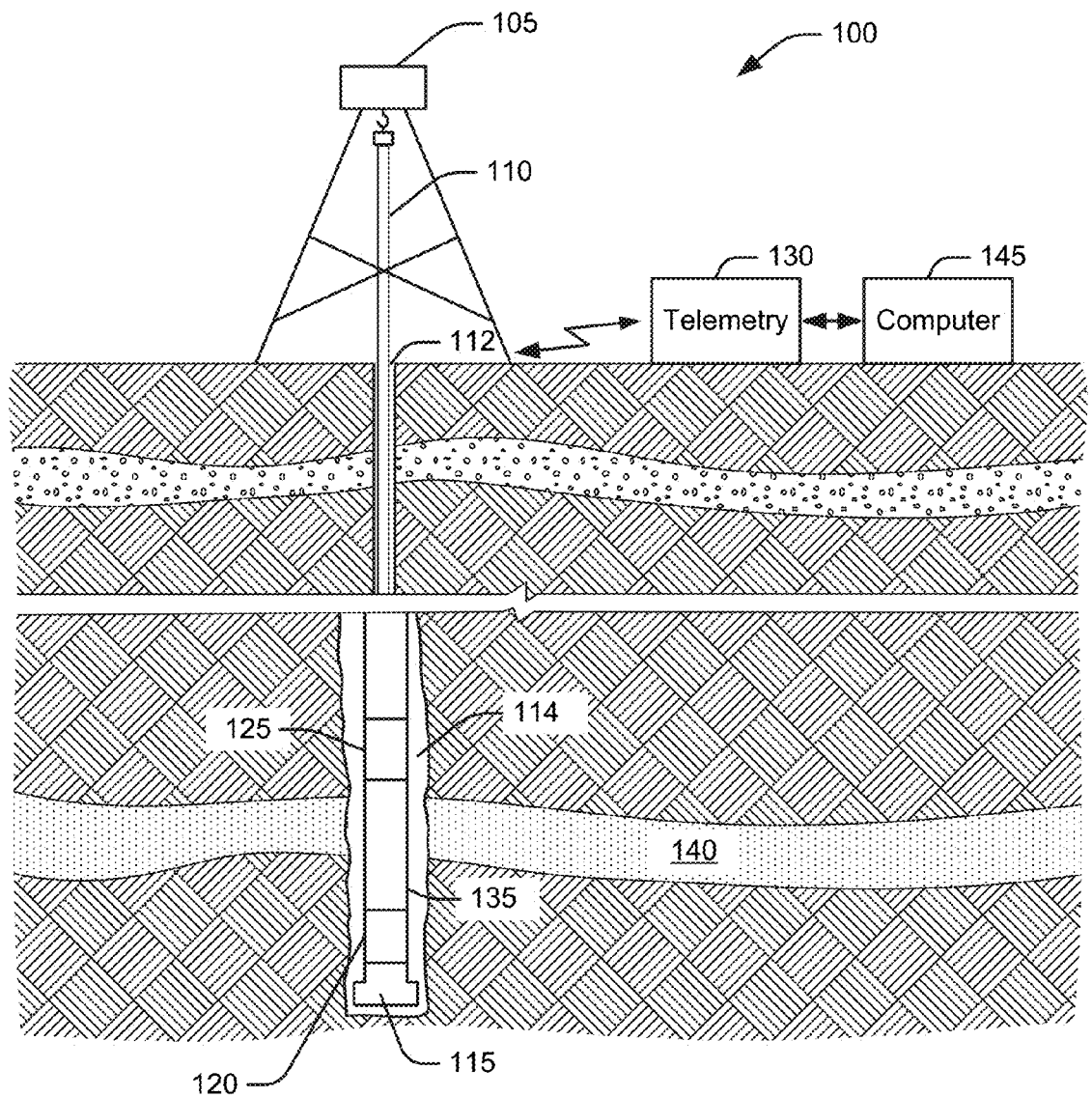
FIG. 1 illustrates a drilling system.

In one embodiment, a drilling system 100, illustrated in FIG. 1, includes a derrick 105 from which a drill string 110 is suspended in a borehole 112. FIG. 1 is greatly simplified and for clarity does not show many of the elements that are used in the drilling process. Further, while FIG. 1 shows a land-based drilling system, the techniques described herein are also useful in a sea-based drilling system and in wireline and slickline systems and operations. In one embodiment, the volume within the borehole 112 around the drill string 110 is called the annulus 114. In one embodiment, the drill string includes a bit 115, a variety of actuators and sensors, shown schematically by element 120, and a telemetry section 125, through which the downhole equipment communicates with a surface telemetry system 130. In one embodiment, the drill string includes a density logging tool 135 to collect data from sub-surface formations, such as formation 140.

In one embodiment, a computer 145 receives data from the downhole equipment and sends commands to the downhole equipment through the surface telemetry system 130. In one embodiment the computer 145 includes input/output devices, memory, storage, and network communication equipment, including equipment necessary to connect to the Internet.

Figure 2:
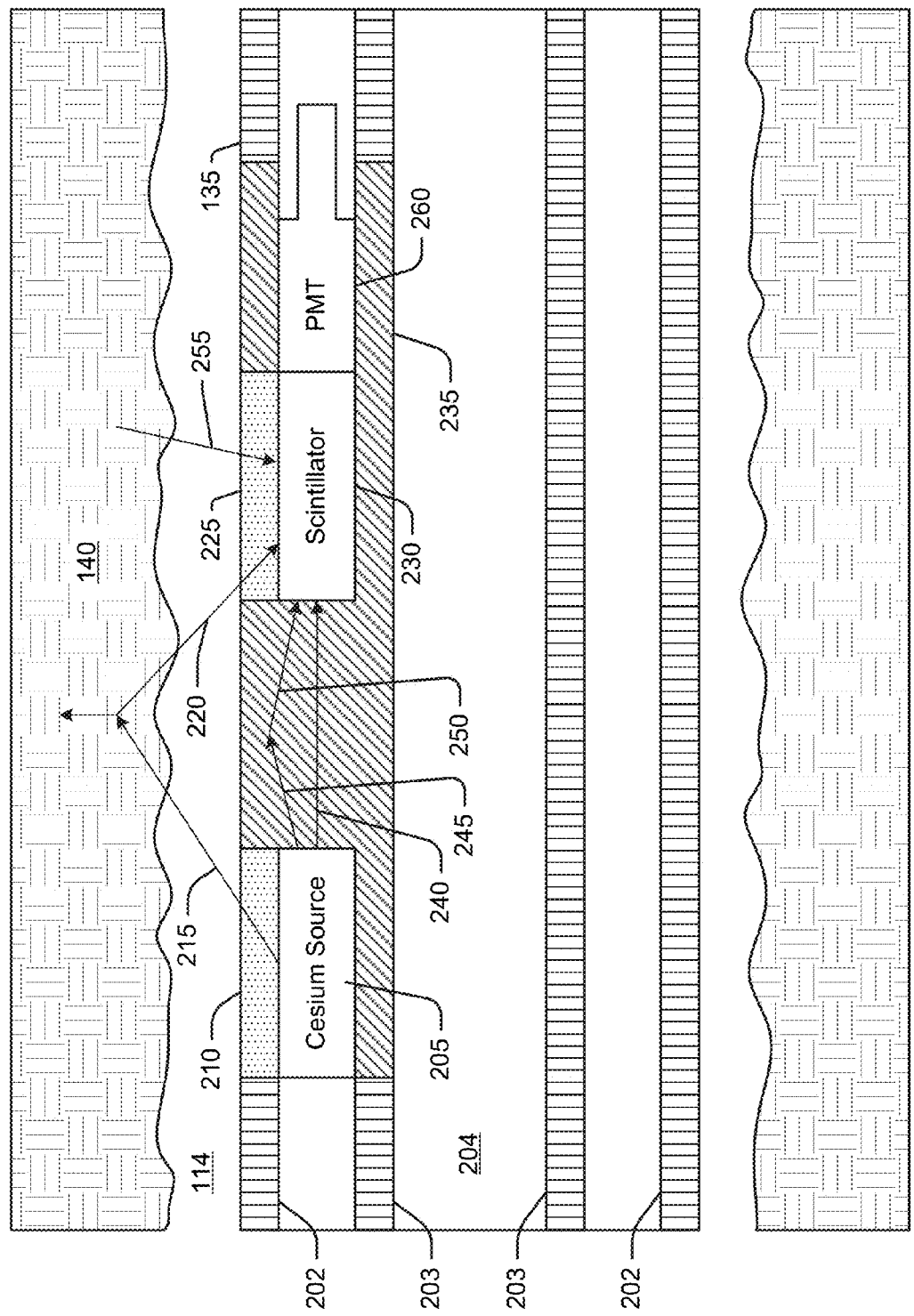
FIG. 2 shows a schematic cross-section of a density logging tool.

In one embodiment, illustrated in FIG. 2, the density logging tool 135 includes an outer shell 202 and an inner shell 203. The inner shell forms a channel through which drilling mud can flow down the drillstring 110 to the bit 115. Devices that perform the functions of the density logging tool 135 are fit in the gap between the outer shell 202 and the inner shell 203.

In one embodiment, the density logging tool 135 includes a cesium (Cs) source 205, which provides gamma rays with a known energy of approximately 662 kilo-electron-Volts ("keV"). In one embodiment, the gamma rays 215 produced by the cesium source 205 exit the density logging tool 135 through a source low density window 210. The gamma rays 215 penetrate the formation 140. In one embodiment, some of the gamma rays 220 scatter from the formation back to the density logging tool 135 where they pass through a scintillator low density window 225 to a scintillator 230. In one embodiment, the scintillator 230 is shielded by a tungsten shield 235. In one embodiment, some gamma rays 240 from the cesium source 205 penetrate the tungsten shield 235 and strike the scintillator 225. These gamma rays 220 and 240 from the cesium source 205 are used as references for spectrum stabilization, as described below.

Some of the gamma rays 245 from the cesium source 205 cause the tungsten shield 235 to radiate x-rays 250 which reach the scintillator 230 directly or by scattering. These x-rays 250 are also used as references for spectrum stabilization, as described below.

The formation 140 emits gamma rays 255, which are detected by the scintillator 230. In one embodiment, data from the gamma rays 255 is used to calculate the electron density and/or the photoelectric factor of the formation 140.

In one embodiment, the scintillator 230 generates photons as a result of being struck by the gamma rays 220, 240, and 255, and x-rays 250. In one embodiment, a photomultiplier tube ("PMT") 260 is coupled to the scintillator 230. The PMT 260 produces a voltage pulse for each gamma ray or x-ray received by the scintillator 230, with the magnitude of the voltage pulse being related to the energy of the received gamma ray or x-ray.

Figure 3:
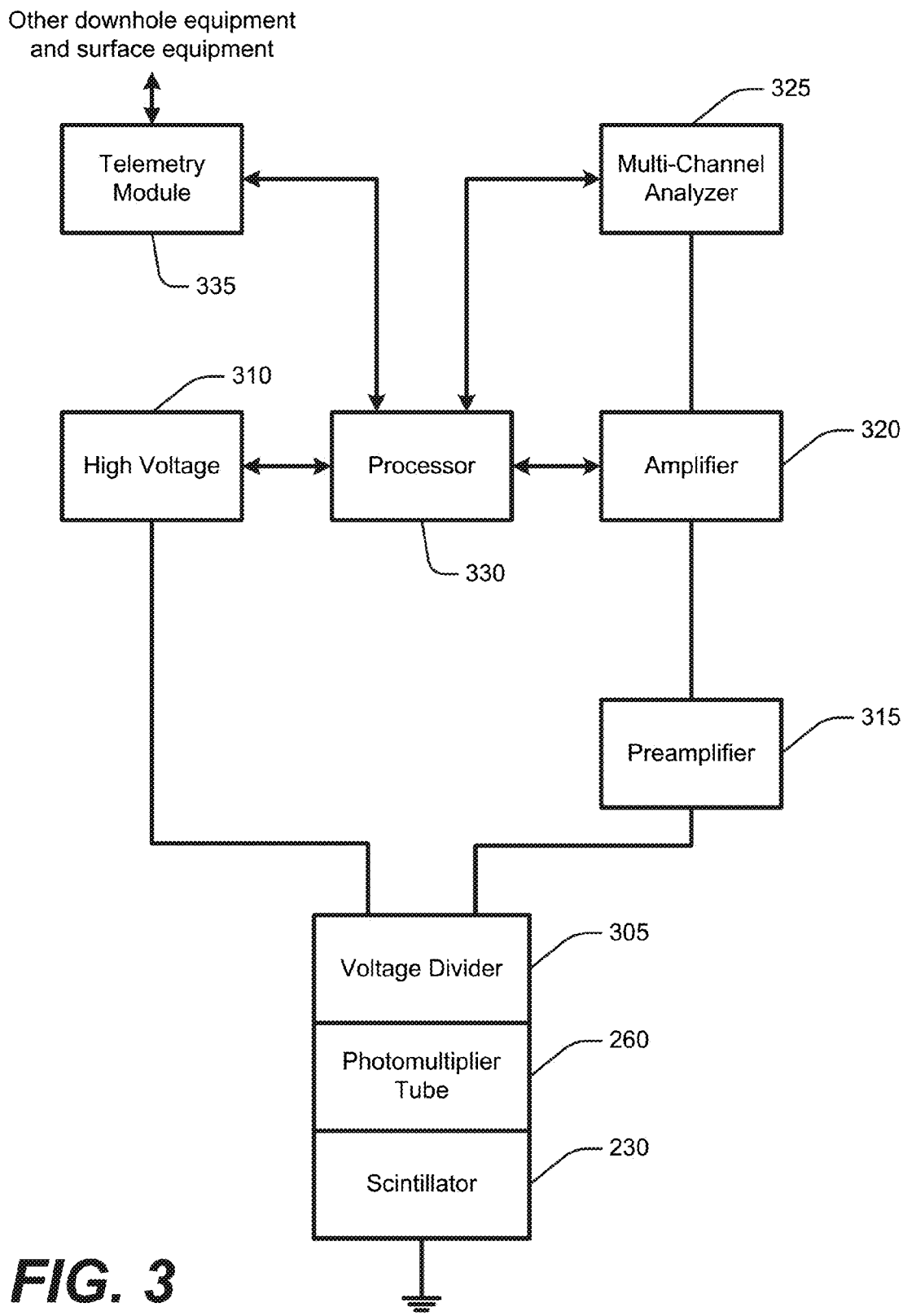
FIG. 3 shows a block diagram of a density logging tool.

Referring now to FIG. 3, in one embodiment, the PMT 260 is coupled to a voltage divider 305. In one embodiment, the voltage divider 305 is coupled to a high voltage source 310. In one embodiment, the high voltage source 310 is coupled to the PMT 260 through the voltage divider 305 so that the high voltage source 310 can control the gain of the PMT 260. That is, by adjusting the high voltage source 310, it is possible to adjust the response of the scintillator 230 and the PMT 260 to radiation striking the scintillator 230.

In one embodiment, the PMT 260 is coupled to a preamplifier 315 through the voltage divider 305. In one embodiment, the preamplifier 315 provides a constant amplification of the voltage from the PMT. In one embodiment, an amplifier 320 is coupled to the output of the preamplifier 315 and provides adjustable amplification of the signal from the preamplifier 315.

In one embodiment, the output of the amplifier 320 is a series of voltage pulses. In one embodiment, each voltage pulse corresponds to the impact of radiation on the scintillator 230. In one embodiment, the height of each voltage pulse corresponds to the energy deposited in the scintillator by the radiation that initiated the pulse.

In one embodiment, the output of the amplifier 320 is coupled to a multi-channel analyzer ("MCA") 325. In one embodiment, the MCA 325 analyzes the stream of voltage pulses it receives from the amplifier 320 and sorts them into a histogram. In one embodiment, the histogram includes a plurality of channels (Ch1, Ch2, . . . ChN). In one embodiment, each channel has a channel number (i.e., Ch1, Ch2, . . . ChN have respective channel numbers C1, C2, . . . CN). In one embodiment, each channel is associated with a range of energy (i.e., each channel Ch1, Ch2, . . . ChN is associated with a respective ranges of energy centered on respective energies E1, E2, . . . EN). In one embodiment, each channel has associated with it a count (C1-count, C2-count, . . . CN-count) representing a number of incidents of radiation having energies in the range of energy associated with that channel received by an apparatus over a detection period of time.

Figure 4:
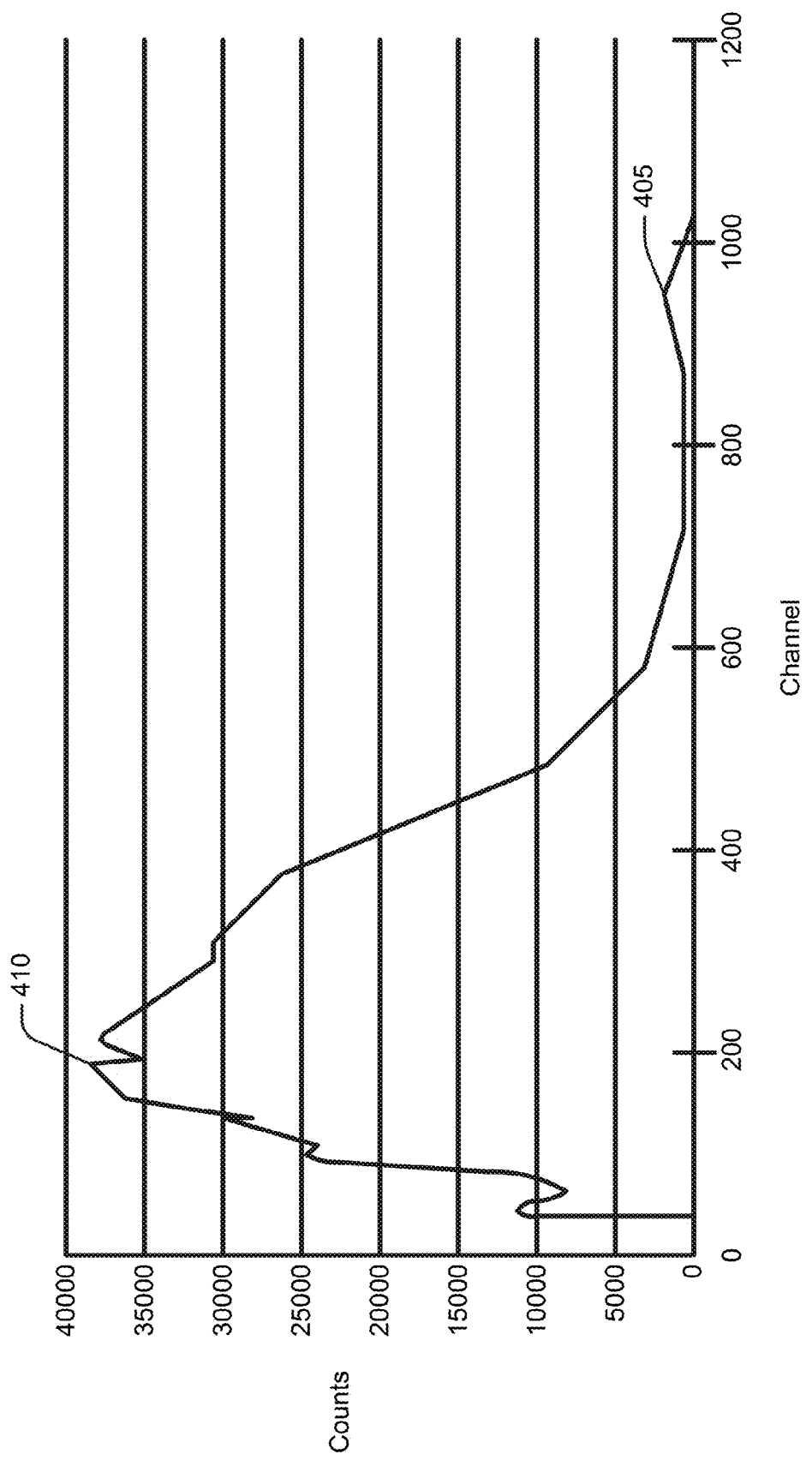
FIGS. 4 and 5 illustrate histograms.
Figure 5:
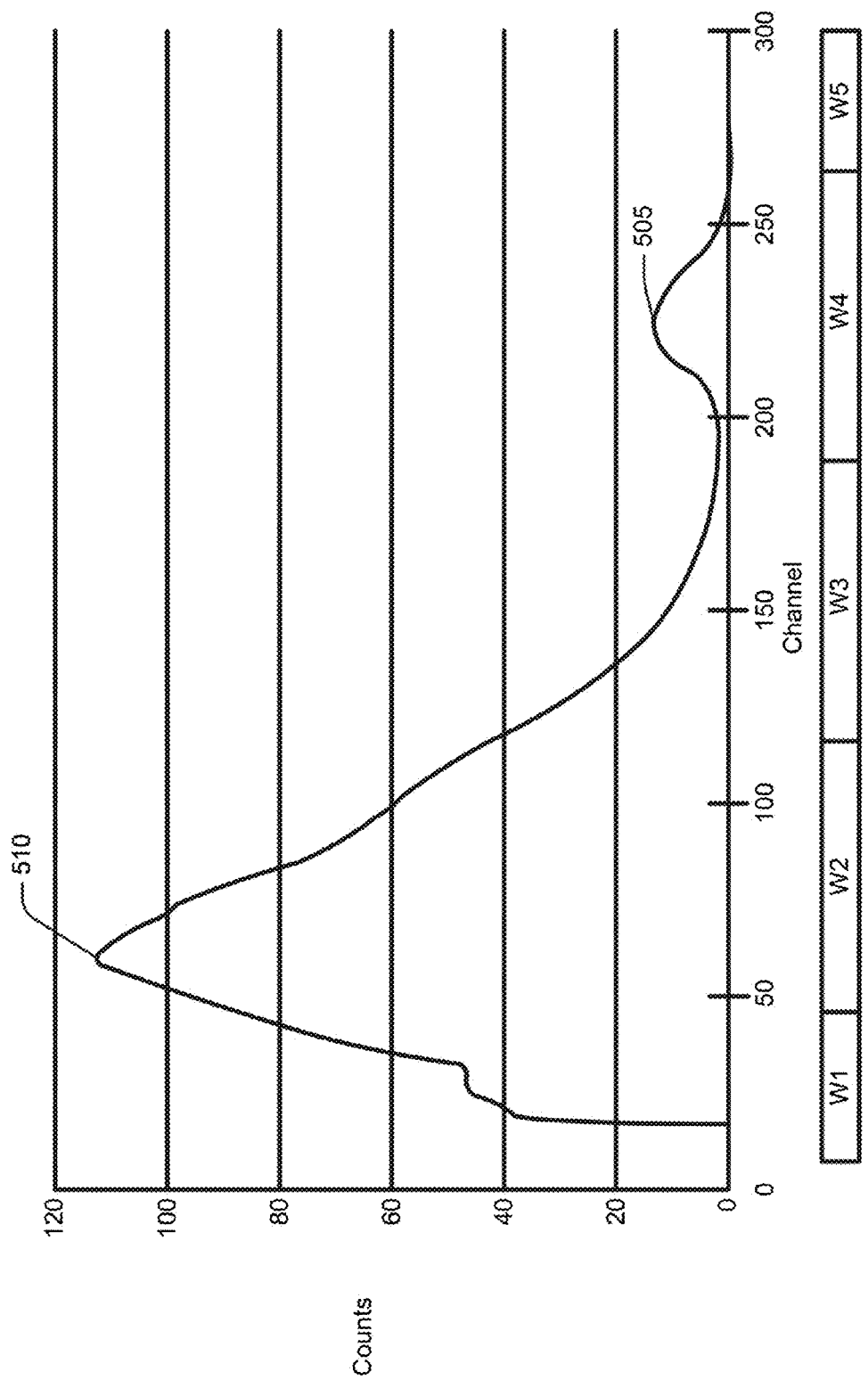

FIGS. 4 and 5 illustrate two such histograms. In FIG. 4, the peak 405 at approximately channel 950 is the 662 keV peak from the cesium source. In FIG. 5, the peak 505 at approximately channel 225 is the 662 keV peak from the cesium source.

As mentioned above, the response of the circuit shown in FIG. 3 tends to drift with age and temperature. As a result, in one embodiment, the correlation between the MCA histogram channel numbers and energy is calibrated periodically. In one embodiment, the peak from the cesium source, as shown in FIGS. 4 and 5, is used for this process. In one embodiment, the following equation is used in this process:

$$E_\gamma = \kappa C_\gamma + E_0 \quad (1)$$

where:
$\kappa$ is an energy scale with units of energy/channel
$C_\gamma$, is a channel number (i.e., C1 . . . CN);
$E\gamma$ is the energy associated with channel $C_\gamma$; and
$E_0$ is a zero offset.

In one embodiment, the peak from the cesium source is adjusted to a desired channel number, $E_0$ is assumed to be zero (to reduce equation 1 to a single unknown, $\kappa$), and equation (1) is solved for $\kappa$. Equation (1), with E0 set to zero, can then be used to identify other features in the histogram.

Figure 6:
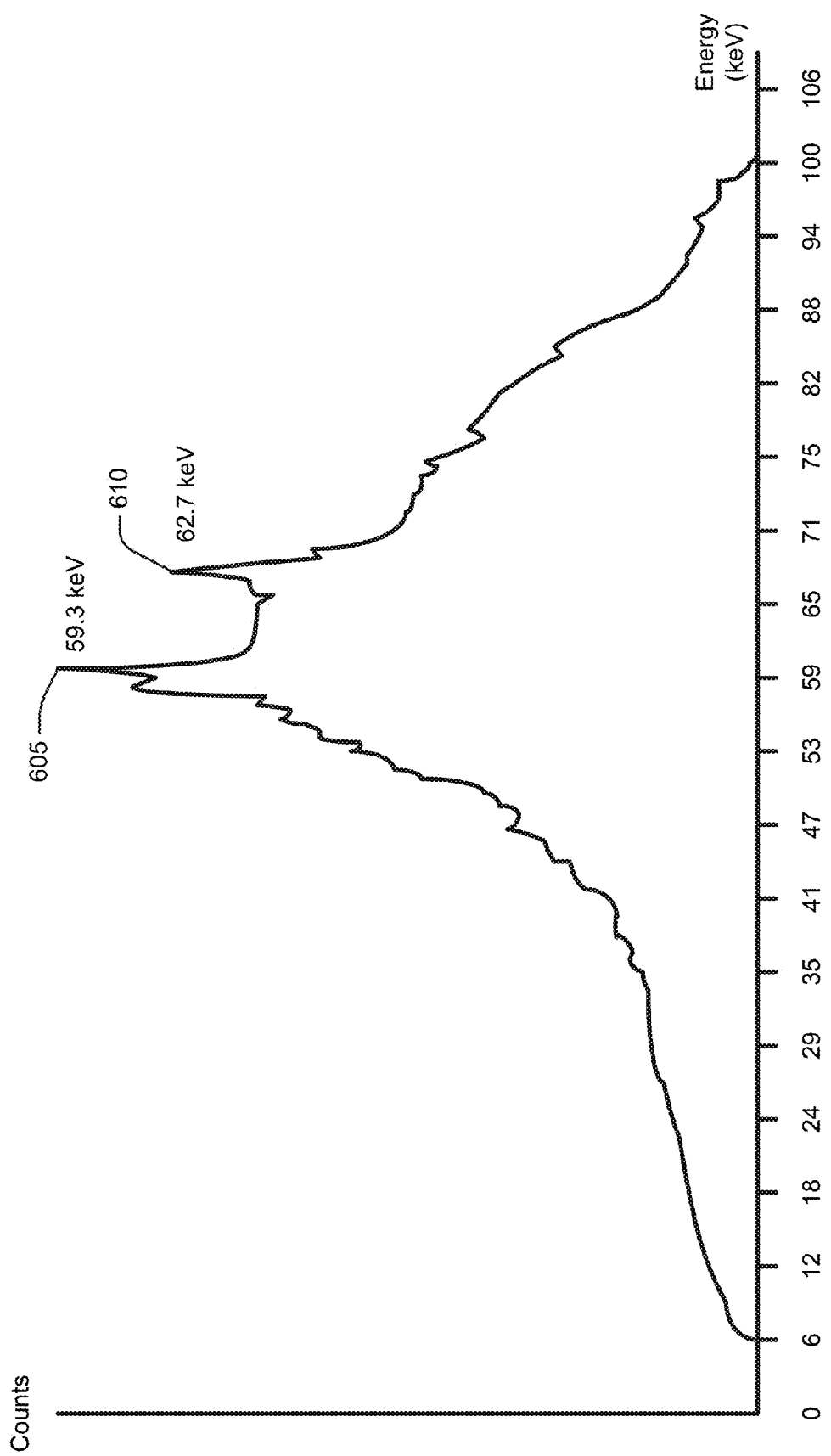
FIG. 6 illustrates a spectrum with two peaks associated with tungsten.

In one embodiment, the spectrum stabilization process takes advantage of the peaks that appear on the MCA histogram as a result of the gamma ray interaction with the tungsten shield 235. Gamma rays interaction with tungsten produces x-ray radiation with peaks 605 and 610 at 59.3 keV and 67.2 keV, respectively, as shown in FIG. 6. By finding the tungsten x-ray peaks in the MCA histogram, it is possible to solve two instances of equation (1) (one instance for the cesium peak and one instance for one of the tungsten peaks) for both unknowns, $\kappa$ and E0. This allows the use of the full equation (1) in the identification of other histogram features.

Figure 7:
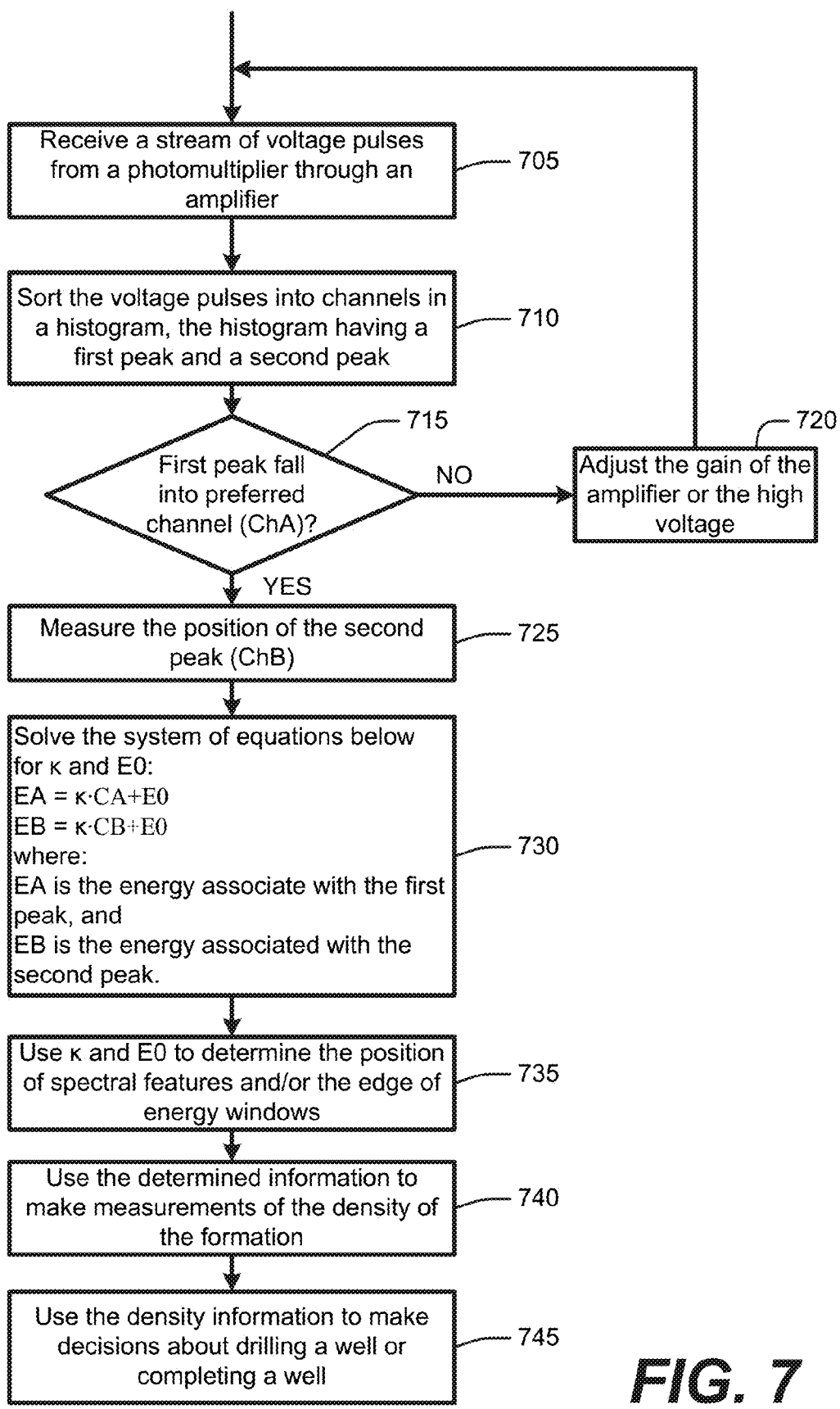
FIG. 7 is a flow chart.

In one embodiment, a processor 330 (see FIG. 3), which may communicate with other downhole equipment and surface equipment by way of a telemetry module 335, performs a two-point stabilization process using the cesium peak and one of the tungsten peaks. The two-point stabilization process, illustrated in FIG. 7, includes the MCA 235 receiving a stream of voltage pulses from the PMT 260 through the preamplifier 315 and amplifier 320 (block 705). In one embodiment, the MCA 235 sorts the voltage pulses into channels in a histogram. In one embodiment, the histogram has a first peak corresponding to the cesium peak and a second peak corresponding to one of the tungsten peaks (block 710). In one embodiment, the processor 330 receives the histogram from the MCA 235 and determines if the first peak falls into a preferred channel (ChA with channel number CA, 1<A<N). If it does not ("NO" branch out of block 715), the processor 330 adjusts the gain of the amplifier 320 or the voltage of the high voltage source 310 (block 720). Elements 705, 710 and 715 are then repeated until the first peak (i.e., the cesium peak) falls into the preferred channel ("YES" branch out of block 715).

The process continues by measuring the position (i.e., channel ChB with channel number CB) of the second peak, i.e., one of the tungsten peaks (block 725). With that information, the channel number for the cesium peak (CA), the energy associated with the cesium peak (EA), the channel number for the tungsten peak (CB), and the energy associated with the tungsten peak (EB) allows the simultaneous solution of the following system of equations for $\kappa$ and $E_0$ (block 730):

$$EA = \kappa \cdot CA + E0 \quad (2)$$

$$EB = \kappa \cdot CB + E0 \quad (3)$$

With knowledge of $\kappa$ and $E_0$, it is possible to more precisely solve equation (1) than without the knowledge of both $\kappa$ and $E_0$. Equation (1) can be used to identify the edge of energy windows in the histogram, such as energy windows W1, W2, W3, W4, and W5 shown in FIG. 5, or the position of spectral features (block 735), such as the peak 410 at about channel 200 in FIG. 4 or the peak 510 at about channel 70 in FIG. 5. With that knowledge, it is possible to estimate the electron density and the photoelectric factor of the formation 140 (block 740), which allows an operator to make decisions about drilling a well or completing a well (block 745).

Figure 8:
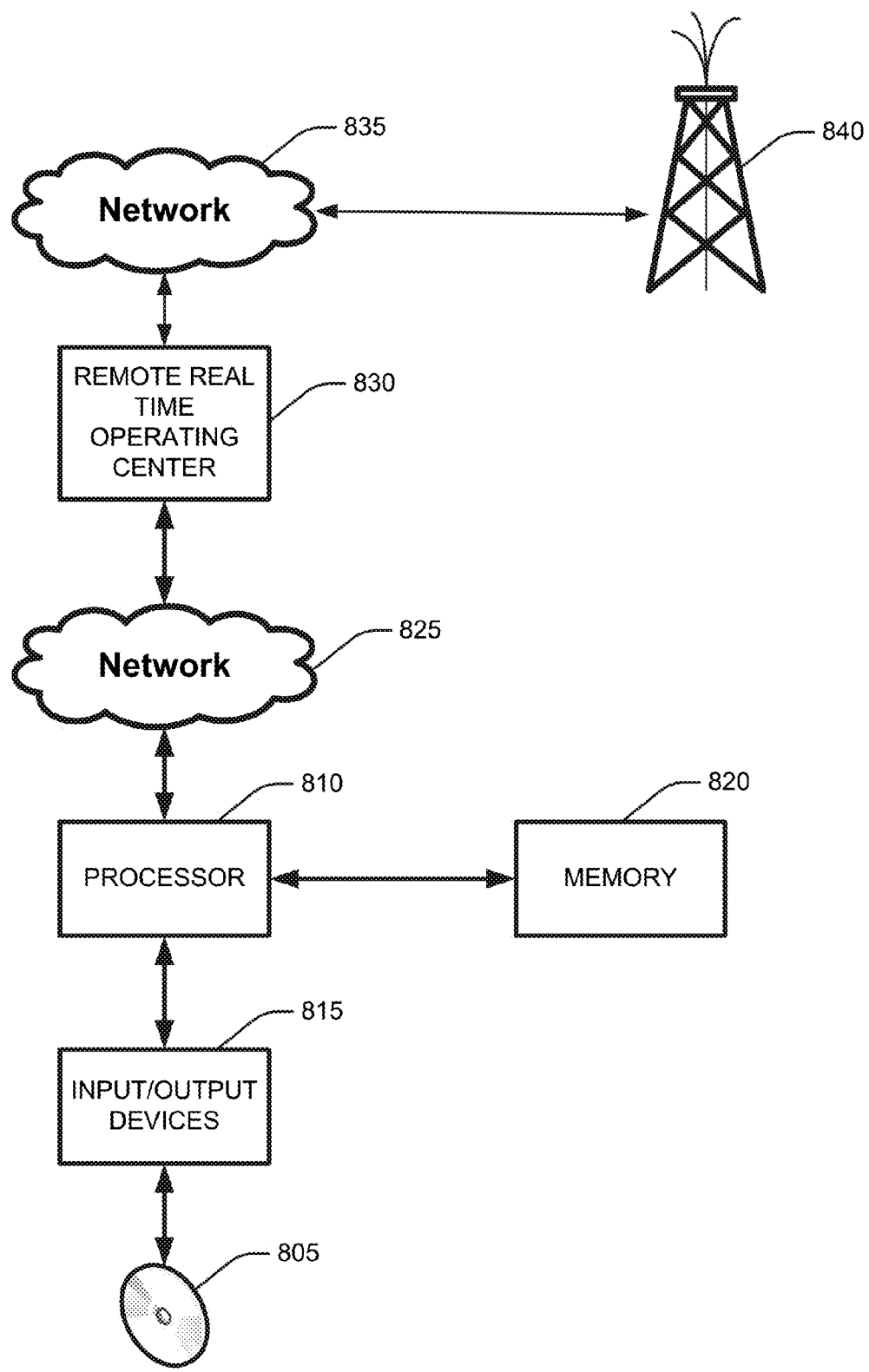
FIG. 8 illustrates an environment.

In one embodiment, shown in FIG. 8, the density logging tool 135 is controlled by software in the form of a computer program on a non-transitory computer readable media 805, such as a CD, a DVD, a USB drive, a portable hard drive or other portable memory. In one embodiment, a processor 810, which may be the same as or included in the processor 330 or the computer 145, reads the computer program from the computer readable media 805 through an input/output device 815 and stores it in a memory 820 where it is prepared for execution through compiling and linking, if necessary, and then executed. In one embodiment, the system accepts inputs through an input/output device 815, such as a keyboard or keypad, mouse, touchpad, touch screen, etc., and provides outputs through an input/output device 815, such as a monitor or printer. In one embodiment, the system stores the results of calculations in memory 820 or modifies such calculations that already exist in memory 820.

In one embodiment, the results of calculations that reside in memory 820 are made available through a network 825 to a remote real time operating center 830. In one embodiment, the remote real time operating center 830 makes the results of calculations available through a network 835 to help in the planning of oil wells 840 or in the drilling of oil wells 840.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:
1. A method comprising:
   a processor receiving a histogram from an apparatus having:
      a housing;
      a source of gamma rays within the housing;
      a window made of low-density material positioned in the housing to permit radiation to enter the housing;

a scintillator positioned inside the housing to produce photons in response to radiation entering the housing through the window;
a tungsten shield adjacent the scintillator;
a photomultiplier coupled to the scintillator to produce photomultiplier voltage pulses having magnitudes related to an energy of radiation striking the scintillator;
an adjustable voltage source coupled to the photomultiplier, wherein the magnitude of the voltage pulses produced by the photomultiplier is related to a voltage source voltage supplied by the voltage source;
an adjustable amplifier coupled to the photomultiplier to amplify the photomultiplier voltage pulses and produce amplified photomultiplier voltage pulses;
the histogram having:
a plurality of channels Ch1, Ch2, . . . ChN,
wherein channels Ch1, Ch2, . . . ChN have respective channel numbers C1, C2, . . . CN;
wherein each channel has associated with it a respective count, C1-count, C2-count, . . . CN-count, representing a number of rays having energies in a range of energy associated with that channel received by the apparatus over a detection period of time;
the processor determining that a first-peak channel (ChA with channel number CA, 1<A<N) represents a first peak in the histogram;
the processor determining that ChA is associated with a known first-peak energy (EA);
the processor determining that a second-peak channel (ChB with channel number CB, 1<B<N, A≠B) represents a second peak in the histogram;
the processor determining that ChB is associated with a known second-peak energy (EB) having an energy of X-rays emitted by the tungsten shield as a result of the tungsten shield being irradiated by gamma rays from the source of gamma rays;
the processor solving a system of equations for an energy scale, κ (having units of energy/channel), and a zero offset, E0, wherein:
a first equation in the system of equations is a function of EA and CA, and
a second equation in the system of equations is a function of EB and CB;
the processor using a function of EM, CM, κ, and E0 to identify features in the histogram, wherein EM is an energy associated with the Mth channel in the histogram, and CM is the channel number of the Mth channel (ChM) in the histogram;
the processor using the identified features in the histogram to calculate a parameter of a formation around a well from which the histogram originated.

2. The method of claim 1 wherein:
the system of equations comprises:

$$EA = \kappa \cdot CA + E0, \text{ and}$$

$$EB = \kappa \cdot CB + E0; \text{ and}$$

the function of EM, CM, κ, and E0 comprises:

$$EM = \kappa \cdot CM + E0.$$

3. The method of claim 1 further comprising:
the processor adjusting a gain of the apparatus so that CA is associated with EA.

4. The method of claim 1 wherein EA is the energy of gamma rays emitted by cesium.

5. The method of claim 1 wherein identifying features in the histogram comprises identifying one of the group consisting of peaks in the histogram and the edges of energy windows in the histogram.

6. A computer program stored in a non-transitory computer-readable storage medium, the computer program comprising executable instructions that cause a processor to:
receive a histogram from an apparatus having:
a housing;
a source of gamma rays within the housing;
a window made of low-density material positioned in the housing to permit radiation to enter the housing;
a scintillator positioned inside the housing to produce photons in response to radiation entering the housing through the window;
a tungsten shield adjacent the scintillator;
a photomultiplier coupled to the scintillator to produce photomultiplier voltage pulses having magnitudes related to an energy of radiation striking the scintillator;
an adjustable voltage source coupled to the photomultiplier, wherein the magnitude of the voltage pulses produced by the photomultiplier is related to a voltage source voltage supplied by the voltage source;
an adjustable amplifier coupled to the photomultiplier to amplify the photomultiplier voltage pulses and produce amplified photomultiplier voltage pulses;
the histogram having:
a plurality of channels Ch1, Ch2, ChN,
wherein channels Ch1, Ch2, ChN have respective channel numbers C1, C2, . . . CN;
wherein each channel has associated with it a respective count, C1-count, C2-count, . . . CN-count, representing a number of rays having energies in a range of energy associated with that channel received by the apparatus over a detection period of time;
determine that a first-peak channel (ChA with channel number CA, 1<A<N) represents a first peak in the histogram;
determine that ChA is associated with a known first-peak energy (EA);
determine that a second-peak channel (ChB with channel number CB, 1<B<N, A≠B) represents a second peak in the histogram;
determine that ChB is associated with a known second-peak energy (EB) having an energy of X-rays emitted by the tungsten shield as a result of the tungsten shield being irradiated by gamma rays from the source of gamma rays;
solve a system of equations for an energy scale, κ (having units of energy/channel), and a zero offset, E0, wherein:
a first equation in the system of equations is a function of EA and CA, and
a second equation in the system of equations is a function of EB and CB;
use a function of EM, CM, κ, and E0 to identify features in the histogram, wherein EM is an energy associated with the Mth channel in the histogram, and CM is the channel number of the Mth channel (ChM) in the histogram;
use the identified features in the histogram to calculate a parameter of a formation around a well from which the histogram originated.

7. The computer program of claim 6 wherein:
the system of equations comprises:

$$EA = \kappa \cdot CA + E0, \text{ and}$$

$$EB = \kappa \cdot CB + E0; \text{ and}$$

the function of EM, CM, κ, and E0 comprises:

$$EM = \kappa \cdot CM + E0.$$

8. The computer program of claim 6 further comprising executable instructions that cause the processor to:
adjust a gain of the apparatus so that CA is associated with EA.

9. The computer program of claim 6 wherein EA is the energy of gamma rays emitted by cesium.

10. The computer program of claim 6 wherein, when identifying features in the histogram, the processor identifies one of the group consisting of peaks in the histogram and edges of energy windows in the histogram.

11. An apparatus comprising:
a housing;
a source of gamma rays within the housing;
a window made of low-density material positioned in the housing to permit radiation to enter the housing;
a scintillator positioned inside the housing to produce photons in response to radiation entering the housing through the window;
a tungsten shield adjacent the scintillator;
a photomultiplier coupled to the scintillator to produce photomultiplier voltage pulses having magnitudes related to an energy of radiation striking the scintillator;
an adjustable voltage source coupled to the photomultiplier, wherein the magnitude of the voltage pulses produced by the photomultiplier is related to a voltage source voltage supplied by the voltage source;
an adjustable amplifier coupled to the photomultiplier to amplify the photomultiplier voltage pulses and produce amplified photomultiplier voltage pulses;
a multi-channel analyzer coupled to the amplifier to:
sample and digitize the amplified photomultiplier voltage pulses, and
produce a histogram comprising:
a plurality of channels Ch1, Ch2, ... ChN,
wherein channels Ch1, Ch2, ... ChN have respective channel numbers C1, C2, ... CN;
wherein each channel has associated with it a respective count, C1-count, C2-count, ... CN-count, representing a number of rays having energies in a range of energy associated with that channel received by an apparatus over a detection period of time;
a processor programmed to:
determine that a first-peak channel (ChA with channel number CA, 1<A<N) represents a first peak in the histogram;
determine that ChA is associated with a known first-peak energy (EA);
determine that a second-peak channel (ChB with channel number CB, 1<B<N, A≠B) represents a second peak in the histogram;
determine that ChB is associated with a known second-peak energy (EB) having an energy of X-rays emitted by the tungsten shield as a result of the tungsten shield being irradiated by gamma rays from the source of gamma rays;
solve a system of equations for an energy scale, κ (having units of energy/channel), and a zero offset, E0, wherein:
a first equation in the system of equations is a function of EA and CA, and
a second equation in the system of equations is a function of EB and CB;
use a function of EM, CM, κ, and E0 to identify features in the histogram, wherein EM is an energy associated with the Mth channel in the histogram, and CM is the channel number of the Mth channel (ChM) in the histogram; and
use the identified features in the histogram to calculate a density of a formation around a well from which the gamma rays originated.

12. The apparatus of claim 11 wherein:
the system of equations comprises:

$$EA = \kappa \cdot CA + E0, \text{ and}$$

$$EB = \kappa \cdot CB + E0; \text{ and}$$

the function of EM, CM, κ, and E0 comprises:

$$EM = \kappa \cdot CM + E0.$$

13. The apparatus of claim 11 further comprising:
a connection from the processor to a photomultiplier gain adjuster selected from the group consisting of the adjustable voltage source and the adjustable amplifier;
wherein the processor is programmed to adjust the photomultiplier so that CA is associated with EA.

14. The apparatus of claim 11 wherein EA is the energy of gamma rays emitted by cesium.

15. The apparatus of claim 11 wherein, when identifying features in the histogram, the processor identifies one of the group consisting of peaks in the histogram and edges of energy windows in the histogram.

* * * * *